US007546416B2

(12) United States Patent
Yip

(10) Patent No.: US 7,546,416 B2
(45) Date of Patent: Jun. 9, 2009

(54) METHOD FOR SUBSTANTIALLY UNINTERRUPTED CACHE READOUT

(75) Inventor: Aaron Yip, Santa Clara, CA (US)

(73) Assignee: Micron Technology, Inc., Boise, ID (US)

( * ) Notice: Subject to any disclaimer, the term of this patent is extended or adjusted under 35 U.S.C. 154(b) by 389 days.

(21) Appl. No.: 11/474,436

(22) Filed: Jun. 26, 2006

(65) Prior Publication Data

US 2007/0300012 A1    Dec. 27, 2007

(51) Int. Cl.
*G06F 13/00* (2006.01)
*G11C 7/00* (2006.01)

(52) U.S. Cl. .................. 711/118; 711/168; 365/189.05

(58) Field of Classification Search ........................ None
See application file for complete search history.

(56) References Cited

U.S. PATENT DOCUMENTS 6,243,291 B1 * 6/2001 Cheah ................... 365/185.12
7,123,521 B1 * 10/2006 Louie et al. ............. 365/189.05
7,369,447 B2 * 5/2008 Louie et al. ............. 365/189.05
7,372,744 B2 * 5/2008 Shiga et al. ............. 365/189.05
2005/0232011 A1 * 10/2005 Lee et al. ............... 365/185.12

* cited by examiner

*Primary Examiner*—Denise Tran
(74) *Attorney, Agent, or Firm*—Dickstein Shapiro LLP

(57) ABSTRACT

A memory device capable of sequentially outputting multiple pages of cached data while mitigating any interruption typically caused by fetching and transferring operations. The memory device outputs cached data from a first page while data from a second page is fetched into sense amplifier circuitry. When the outputting of the first page reaches a predetermined transfer point, a portion of the fetched data from the second page is transferred into the cache at the same time the remainder of the cached first page is being output. The remainder of the second page is transferred into the cache after all of the data from the first page is output while the outputting of the first portion of the second page begins with little or no interruption.

22 Claims, 8 Drawing Sheets

METHOD FOR SUBSTANTIALLY UNINTERRUPTED CACHE READOUT

FIELD OF THE INVENTION

The invention relates generally to a method and apparatus for operating a memory device to have cache readout.

BACKGROUND OF THE INVENTION

A nonvolatile memory is a type of memory that retains stored data when power is removed. There are various types of nonvolatile memories including e.g., read only memories (ROMs), erasable programmable read only memories (EPROMs), and electrically erasable programmable read only memories (EEPROMs). One type of EEPROM device is a flash EEPROM device (also referred to as "flash memory").

Each nonvolatile memory device has its own unique characteristics. For example, the memory cells of an EPROM device are erased using an ultraviolet light, while the memory cells of an EEPROM device are erased using an electrical signal. In a conventional flash memory device blocks of memory cells are simultaneously erased (what has been described in the art as a "flash-erasure"). The memory cells in a ROM device, on the other hand, cannot be erased at all. EPROMs, and EEPROMs, including flash memory, are commonly used in computer systems that require reprogrammable nonvolatile memory.

Two common types of flash memory architectures are the "NAND" and "NOR" architectures, so called for the resemblance which the basic memory cell configuration of each architecture has to a basic NAND or NOR gate circuit, respectively. In the NOR architecture, the floating gate memory cells of the memory array are arranged in a matrix. The gates of each floating gate memory cell of the array matrix are connected by rows to word lines and their drains are connected to bit lines. The source of each floating gate memory cell is typically connected to a common source line. The NOR architecture floating gate memory array is accessed by a row decoder activating a row of floating gate memory cells by selecting the word line connected to their gates. The data values of memory cells in a selected row are placed on the bit lines based on the application of a current from the connected source line to the connected bit lines.

A NAND array architecture also arranges its array of floating gate memory cells in a matrix such that the gates of each floating gate memory cell are connected by rows to word lines. However, each memory cell is not directly connected to a source line and a bit line. Instead, the memory cells of the array are arranged together in strings, typically of 8, 16, 32, or more, where the memory cells in the string are connected together in series, source to drain, between a common source line and a bit line. The NAND architecture floating gate memory array is then accessed by a row decoder activating a row of floating gate memory cells by selecting the word line connected to their gates. In addition, the word lines connected to the gates of the unselected memory cells of each string are also driven. However, the unselected memory cells of each string are typically driven by a higher gate voltage so as to operate them as pass transistors, allowing them to pass current in a manner that is unrestricted by their stored data values. Current then flows from the bitline to the source line through the channel of each memory cell of the connected string, restricted only by the memory cells of each string that are selected to be read. Thereby, the current encoded stored data values of the row of selected memory cells are placed on the bit lines.

Generally, in a single level flash memory device, a charged floating gate represents one logic state, e.g., a logic "0", while a non-charged floating gate represents the opposite logic state e.g., a logic "1". A memory cell of a flash array is programmed by placing the floating gate into one of these charged states. Charges may be injected or written onto the floating gate by any number of methods, including e.g., avalanche injection, channel injection, Fowler-Nordheim tunneling, and channel hot electron (CHE) injection. The floating gate may be discharged or erased by any number of methods including e.g., Fowler-Nordheim tunneling. Multi-level programmable flash memory cells are also known.

FIG. 1 illustrates a conventional memory device 10 (e.g., a NAND flash memory device). The memory device 10 includes a memory array 20, sense amplifiers 30, an output data cache 40 and a controller 50. The controller 50 controls operation of the device 10 and, as part of its operation, monitors an address pointer 60, which may be part of an address register, input/output controller, or other logic device on the device 10, that is used to readout, byte-by-byte, data from the cache 40. Typically, NAND flash memory devices contain banks of memory, each bank including its own array 20, sense amplifiers 30 and data cache 40.

FIG. 1 illustrates the device 10 performing a data readout of cached page x data (from cache 40) while simultaneously performing a fetch of page x+1 data from the array 20 into the sense amplifiers 30. The readout from the cache 40 is a sequential, byte-by-byte, readout under the control of the pointer 60, beginning from byte 0 and ending at the last byte in the page (shown as byte 2111). During these operations, the controller 50 sets the status of the read/busy indicator to "busy," which may be monitored by an application or other system component. Since each byte of data takes about 25 ns to be readout of the cache 40, a whole page of 2112 bytes will take about 50 μs. A data fetch operation takes about 20-25 μs. Thus, as shown in FIG. 1, the system/application utilizing the device 10 can typically hide the data fetch time during the sequential data output time of 50 μs.

Referring now to FIG. 2, once the sequential output of the cached page (i.e., page x) is finished, the controller 50 can issue a transfer command to send page x+1 data from the sense amplifier 30 to the cache 40. Referring to FIG. 3, once the transfer is complete, the controller 50 will initiate a data fetch operation for the next page (i.e., page x+2) and the address pointer 60 will begin the sequential, byte-by-byte, readout of the cached page x+1 data (beginning from byte 0). The transfer illustrated in FIG. 2 takes finite amount of time, usually around 2 μs. The issuance of the transfer command and the approximate time to perform the transfer effectively interrupts the data output operation (FIG. 3), which slows down the output throughput of the device 10. The system/application utilizing the device 10 may also suffer additional overhead in hardware and/or software execution time. These effects are undesirable.

BRIEF DESCRIPTION OF THE DRAWINGS

Features and advantages of the invention will be more readily understood from the following detailed description of the invention which is provided in connection with the accompanying drawings, in which.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those of ordinary skill in the art to make and use the invention, and it is to be understood that structural, logical or procedural changes may be made to the specific embodiments disclosed without departing from the spirit and scope of the present invention.

Figure 4:
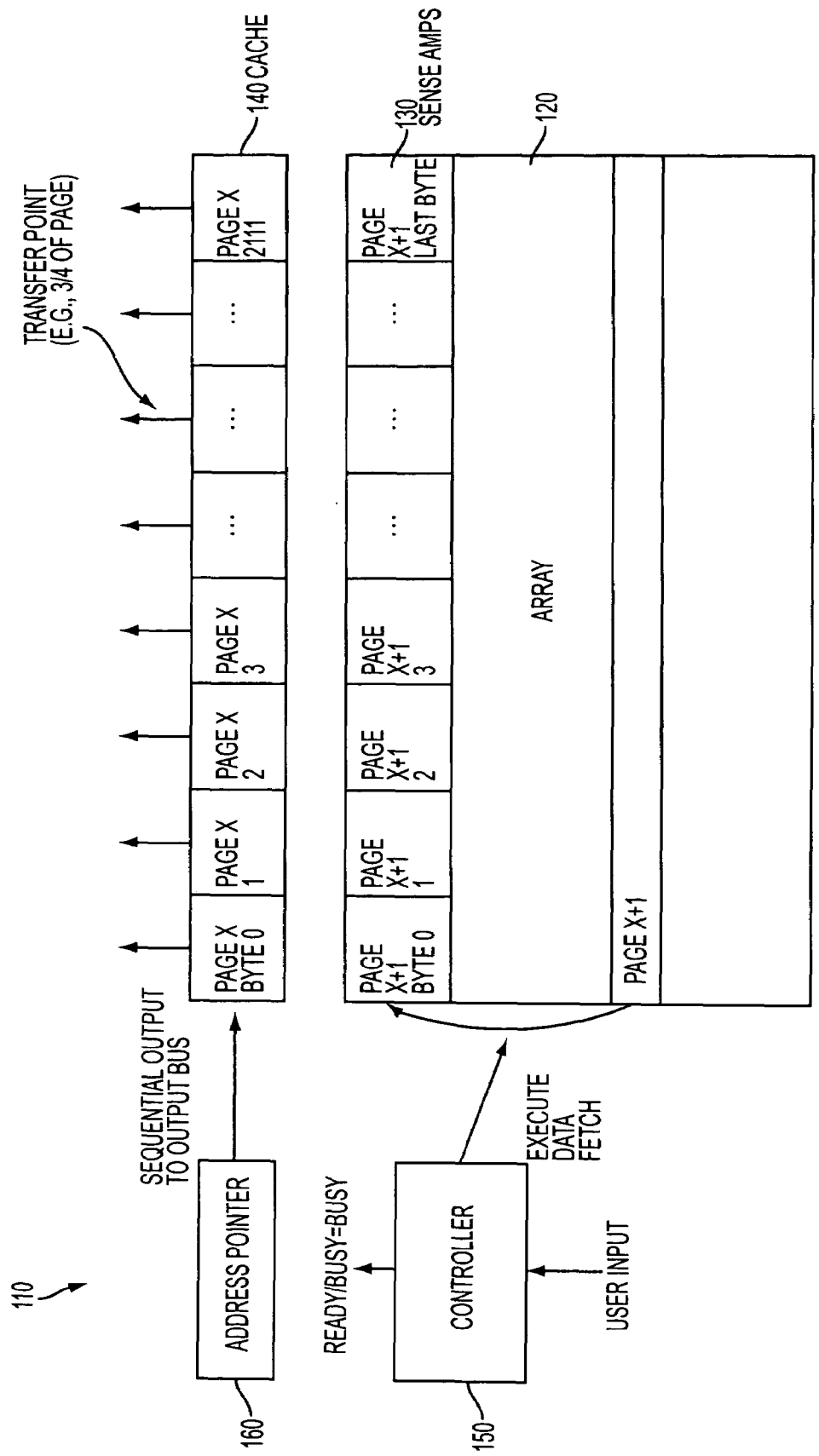
FIG. 4 illustrates a memory device according to the invention performing data readout of cached page x data and a fetch of page x+1 data.

FIG. 4 illustrates a memory device 110 e.g., a NAND flash memory device, constructed in accordance with an embodiment of the invention. The memory device 110 includes a memory array 120, sense amplifiers 130, data cache 140 and a controller 150. The controller 150 controls operation of the device 110 and, as part of its operation, monitors an address pointer 160, which may be part of an address register, input/output controller, or other logic device on the device 110, that is used to control byte-by-byte readout from the cache 140. The controller 150 is configured to accept a user input from the system/application utilizing the device 110.

Although not shown, the memory device 110 contains a plurality e.g., at least four, banks of memory, each bank including its own array 120, sense amplifiers 130 and data cache 140. It should be appreciated that the device 110 could comprise data registers, input/output logic and other logic that would normally be associated with a memory device 110 such as a NAND flash memory device. In addition, the invention is not limited to NAND flash memory devices; in fact, the invention may be included on any memory device that utilizes caching and fetching of data prior to the data being readout from the device.

Figure 1:
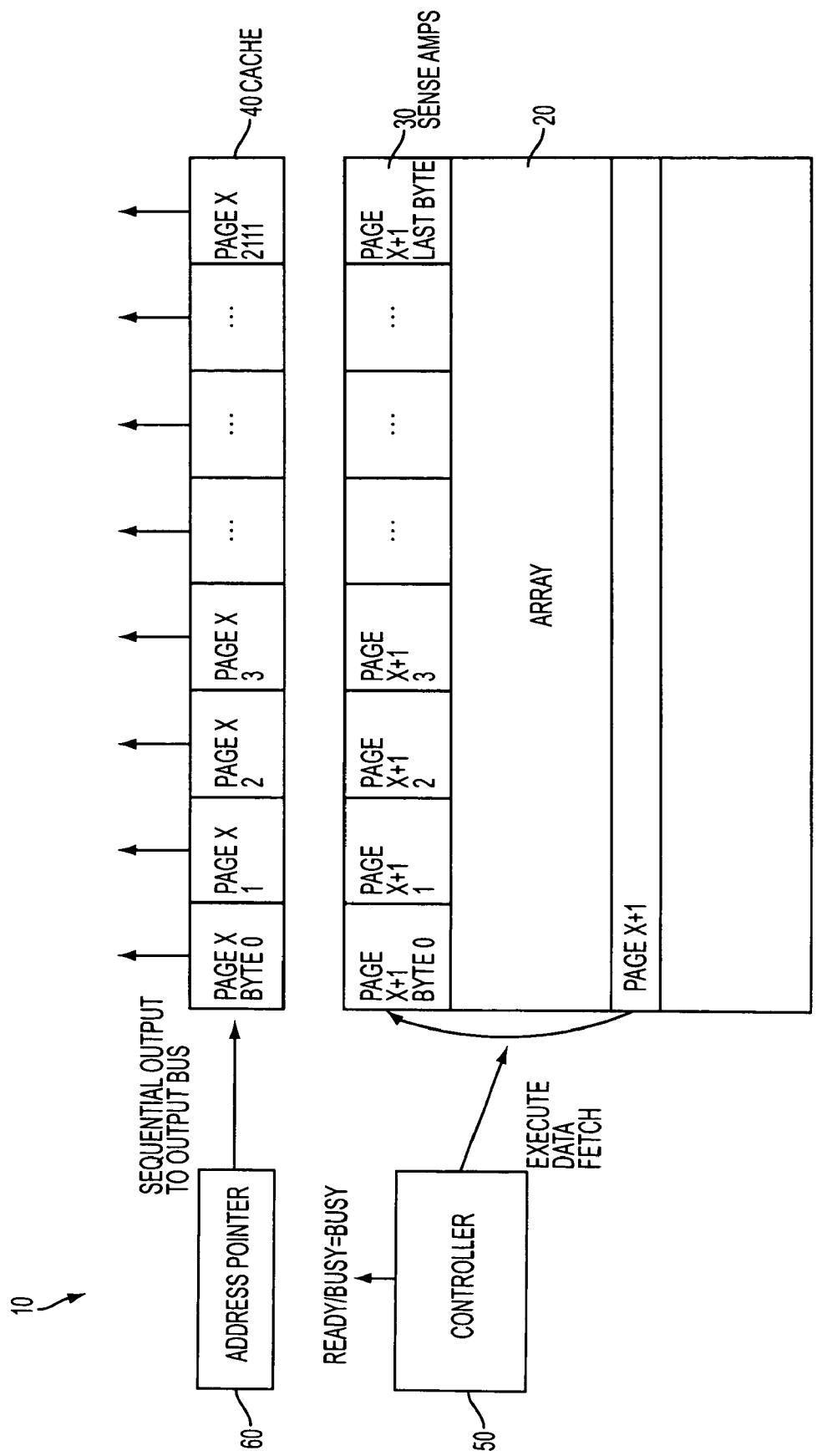
FIG. 1 illustrates a conventional memory device performing data readout of cached page x data and a fetch of page x+1 data.
Figure 2:
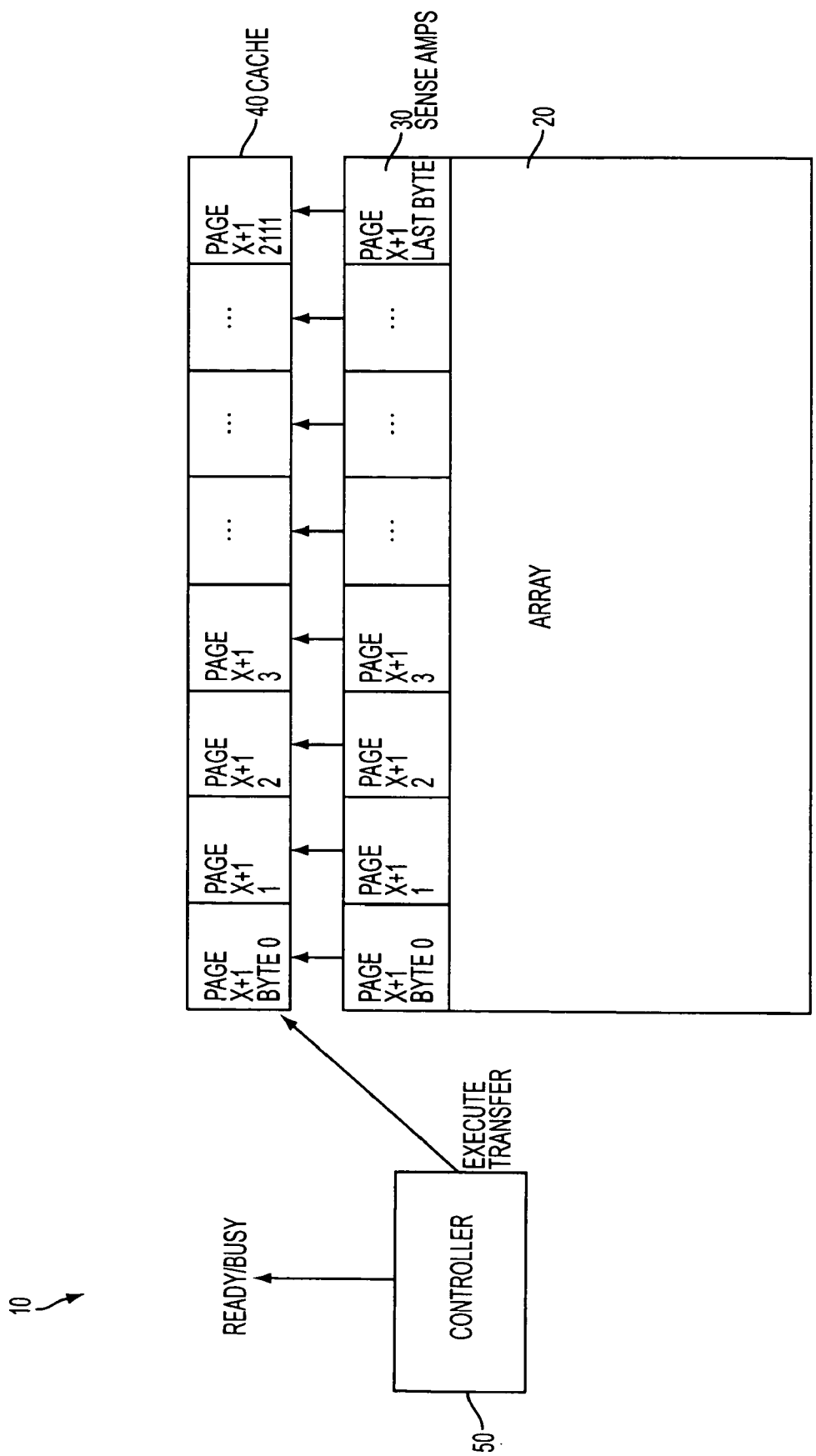
FIG. 2 illustrates the conventional memory device of FIG. 1 performing a data transfer of page x+1 data.
Figure 3:
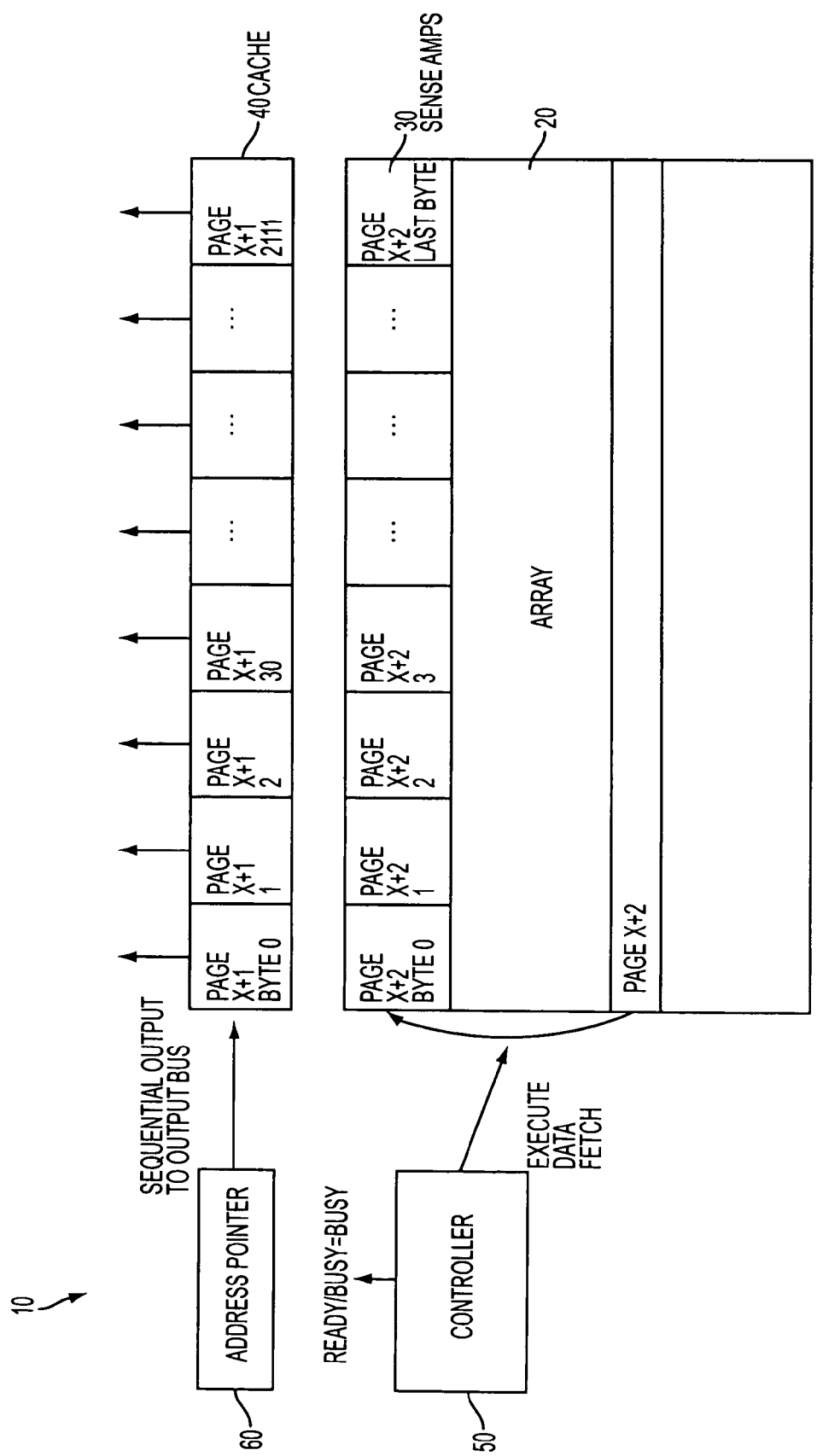
FIG. 3 illustrates the conventional memory device of FIG. 2 performing data readout of cached page x+1 data and a fetch of page x+2 data.

The memory device 110 of the invention is configured to sequentially output multiple pages of data without substantial interruption and thus, improves the output data throughput over the prior art device 10 (FIGS. 1-3). This is achieved by selecting a "transfer point" such as e.g., ¾ of a page, which is a point during the sequential readout from the cache 140 where it is safe to begin transferring a portion of fetched data from the sense amplifiers 130 into the cache 140 even though data is currently being output from the cache 140. Since the transfer operation occurs while data is being output, it is possible to continually output data from the cache 140 (spanning multiple pages) without substantial interruption (described below in more detail).

FIG. 4 illustrates the transfer point as being the point where ¾ of the cached page x data has been readout; that is where ¾ of the cached bytes of a page have been read out. The ¾ page transfer point is just one example of the transfer point that may be used in the invention and is used herein solely to describe the operation of the device 110 in the illustrated example. As is discussed below in more detail, the transfer point may be calculated based on the speed of the device, the number of bytes to fetch/transfer and the time required to fetch each byte, and/or other specifications of the device 110 or the application/system utilizing the device 110. In addition, as is described below in more detail, the controller 150 may input a user selectable transfer point from the application/system utilizing the device 110.

In the illustrated example, it is presumed that each page (i.e., page x, page x+1, page x+2, etc.) comprises 2112 bytes. In the current example, the ¾ page transfer point (i.e., 1584 bytes=2112 bytes/page×¾ page) is a safe transfer point since in the given example it is presumed that it takes approximately 50 μs to sequentially output all of the data from the cache 140, it takes approximately 25 μs to fetch the next page (i.e., page x+1) and a ¾ page output (i.e., 1584 bytes) should take approximately 37 μs. As can be seen from the example, there is a 12 μs margin between the time it takes to output ¾ of a page and the time it takes to fetch the next page. As should be appreciated, the margin can be further refined in a desired embodiment if the application requires a more seamless operation.

Figure 5:
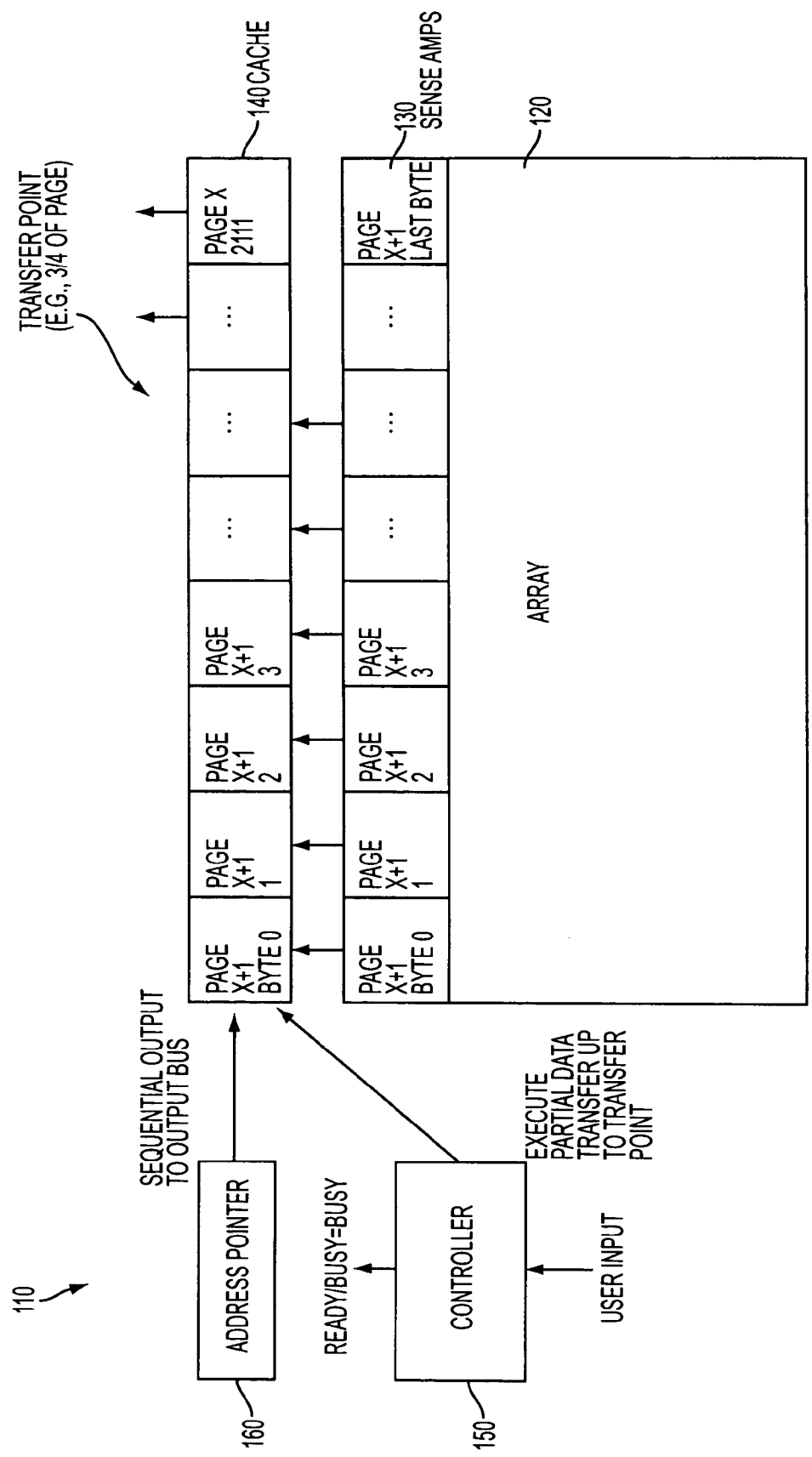
FIG. 5 illustrates the memory device of FIG. 4 performing a data transfer of a first portion of page x+1 data while cached page x data continues being readout from the device.
Figure 6:
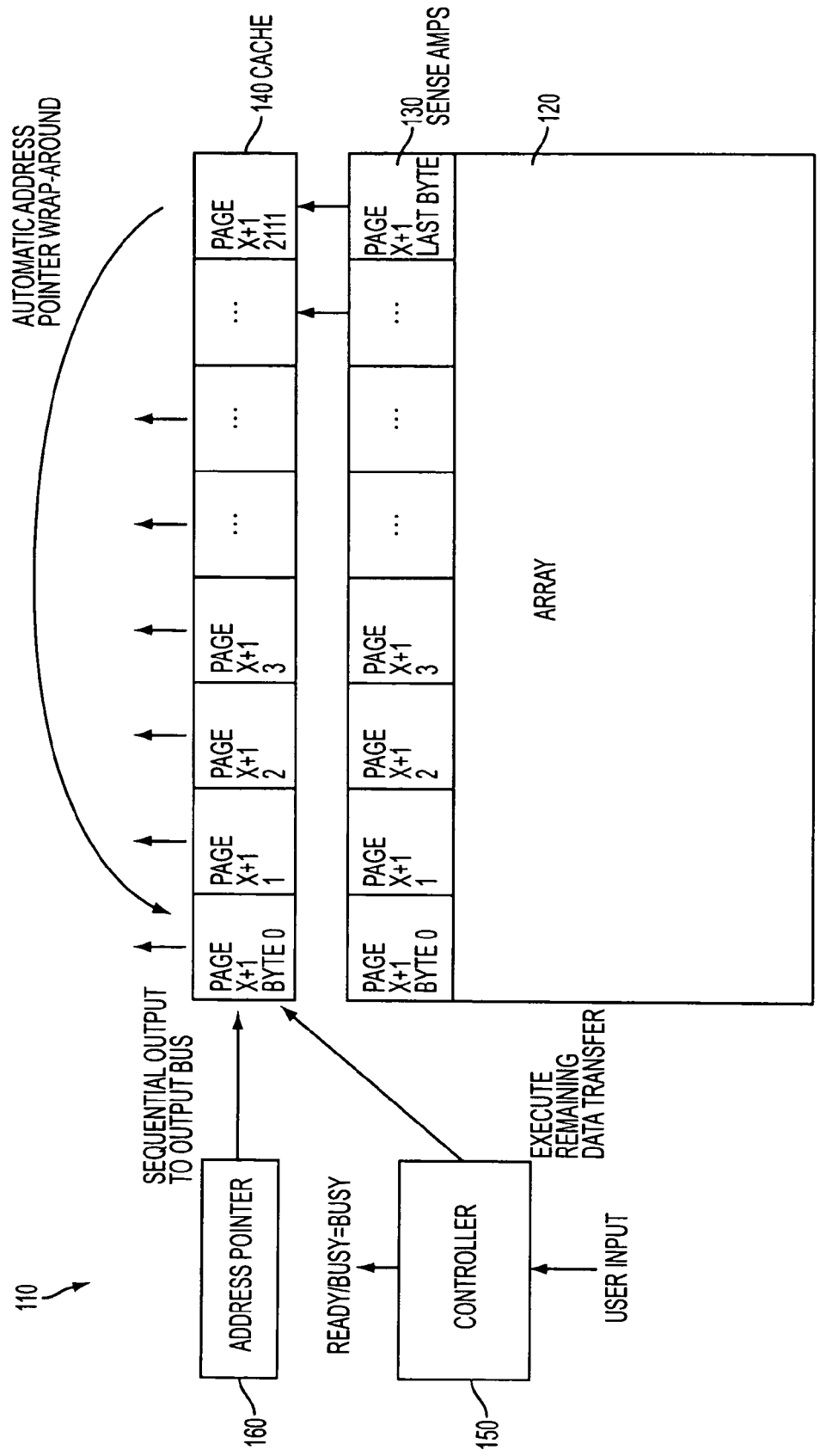
FIG. 6 illustrates the memory device of FIG. 5 performing a data transfer of a second portion of page x+1 data and the initiation of a readout of the first portion of cached page x+1 data.
Figure 7:
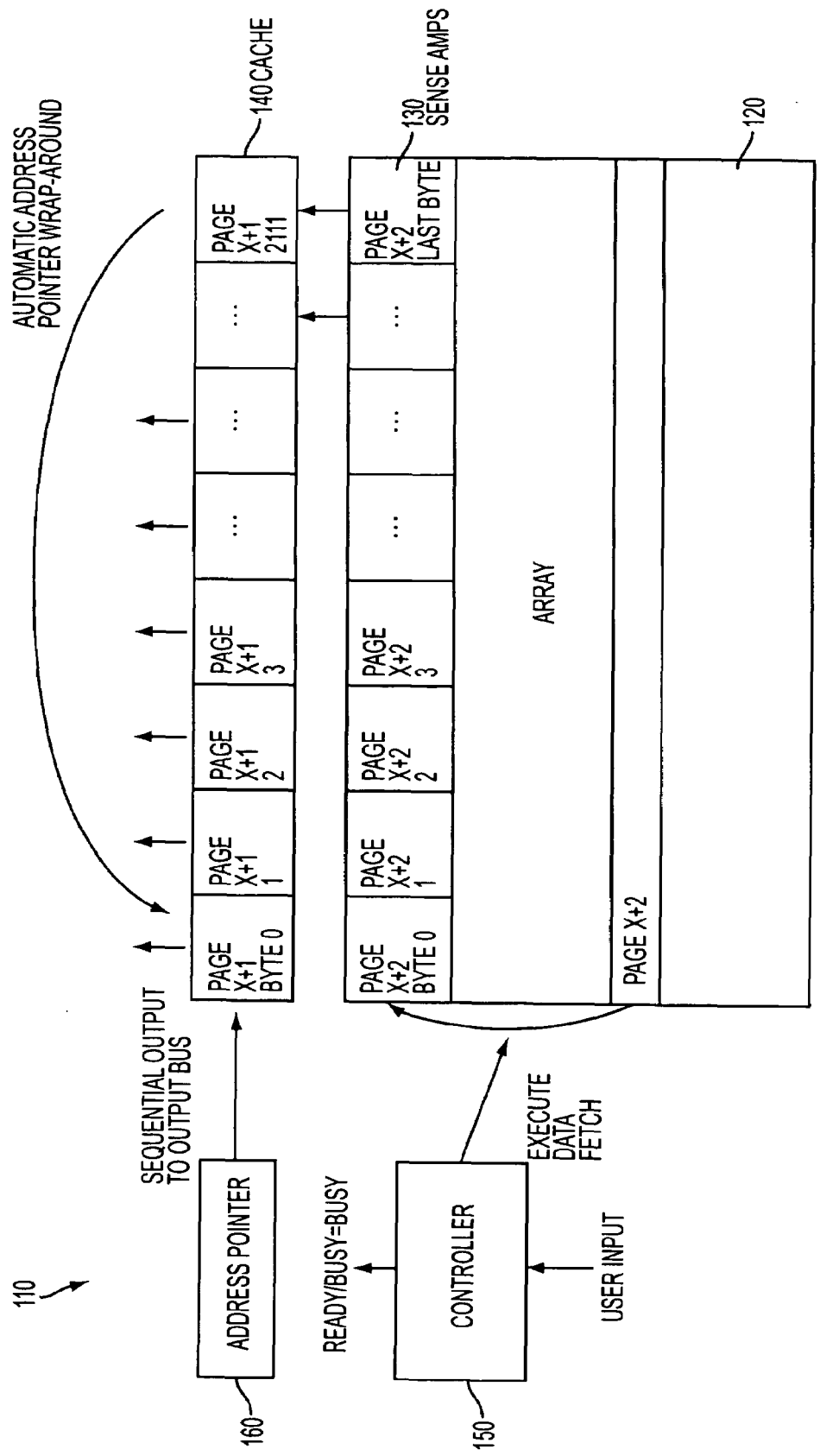
FIG. 7 illustrates the memory device of FIG. 6 performing a data transfer of a first portion of page x+2 data while the remaining cached page x+1 data is being readout from the device.

As shown in FIG. 4, the invention fetches page x+1 data from the array 120 (into the sense amplifiers 130) while sequentially outputting cached page x data at the same time. The cache output occurs byte-by-byte, beginning at byte 0. Referring to FIG. 5, the controller 150 monitors address pointer 160 and initiates the transfer of ¾ f the page x+1 data from the sense amplifiers 130 to the cache 140 once ¾ of the page x cached data has been output (i.e., the output operation reaches the transfer point). That is, because ¾ of the page x data has been output, ¾ of page x+1 can be transferred into the cache without corrupting the readout. As shown in FIGS. 5 and 6, the readout of the cached page x data continues and once the page x data is completely readout of the cache 140, the address pointer wraps around to the beginning of the cache 140. At this point, the transferred portion of the page x+1 data can begin to be readout from the cache 140. At the same time, the controller initiates the transfer of the remaining page x+1 data (e.g., ¼ of the page) because the last ¼ of the cache 140 is free. Once the remaining page x+1 data is transferred to the cache 140, the controller initiates a fetch operation for page x+2 data while the cached page x+1 data is being sequentially output (FIG. 7). This process repeats for all subsequent pages that are to be readout of the device 110.

As set forth above, FIGS. 4-7 illustrate the transfer point as being the point where ¾ of the cached data has been readout. The ¾ page transfer point is just one example of the transfer point that may be used in the invention and was used in the above example solely to describe the operation of the device 110. It should be appreciated that the transfer point may be calculated based on the speed of the device, the number of bytes to fetch/transfer, the time required to fetch each byte and/or desired output throughput or other desired application specification. Any transfer point used must at a minimum be longer than the fetch period plus some specified margin (hereinafter the "minimum value"), which ensures that enough space has been freed up in the cache 140 (i.e., a sufficient number of cached bytes have been output) prior to transferring a portion of the next page into the cache 140. An exemplary transfer point would be above the ¾ page, but less than a full page, which still ensures a desired level of uninterrupted readout from the cache 140. The selected transfer point can be within the range defined by the maximum and minimum values as required by the application/system utilizing the device 110.

In addition, the controller 150 may input a user selectable transfer point from the application/system utilizing the device 110. In the above example, the ¾ page transfer point (i.e., 2112 bytes/page×¾ page=1584 bytes) was determined to be a safe transfer point because there was about a 12 µs margin. This margin can be reduced or increased depending upon the application/system utilizing the device 110 and/or the desired output throughput of the device 110.

Figure 8:
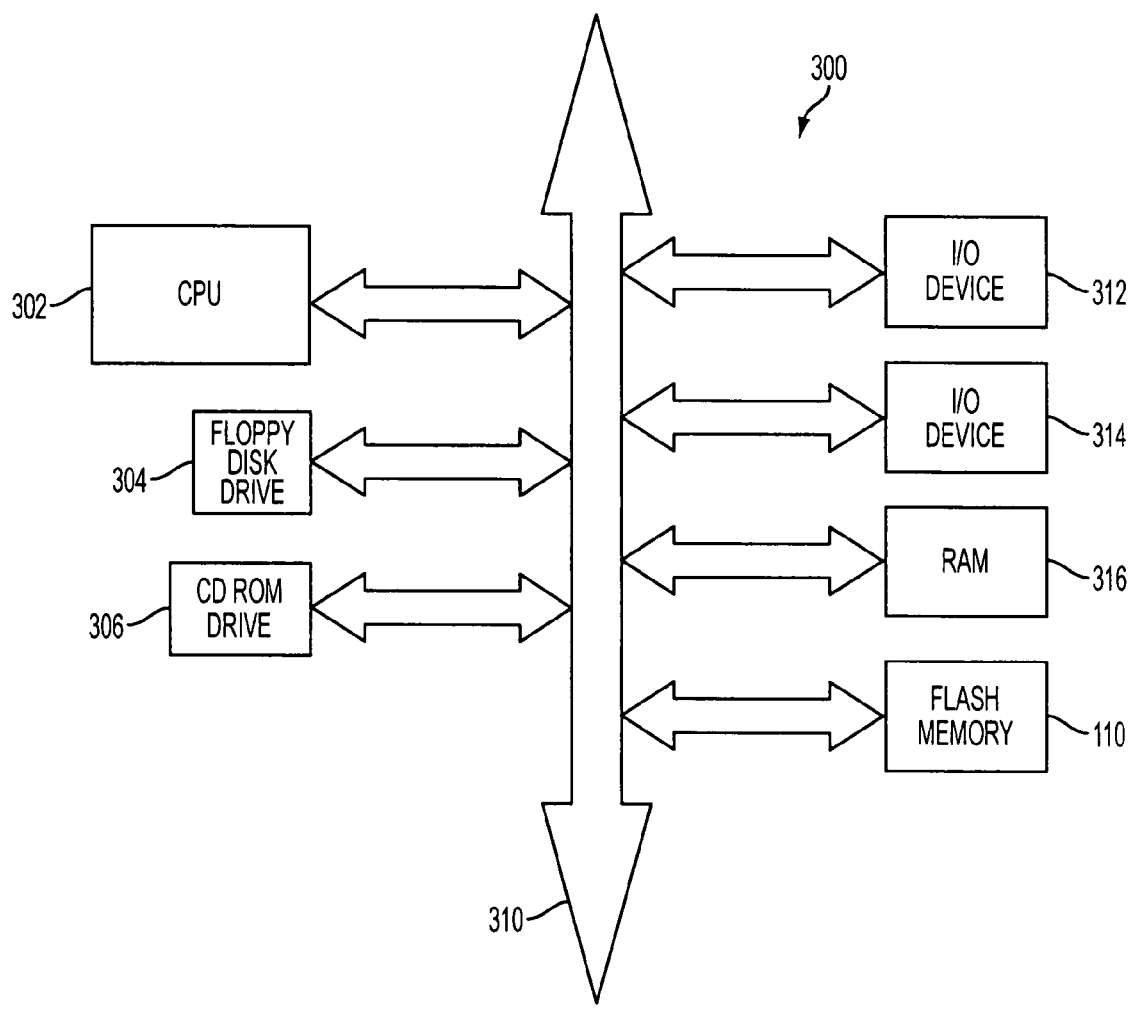
FIG. 8 illustrates a processor system incorporating a memory device constructed in accordance with an embodiment of the invention.

FIG. 8 illustrates a processor system 300 utilizing a memory device, e.g., a flash memory device 110, constructed in accordance with the invention. That is, the memory device 110 achieves uninterrupted cache readout (described above with reference to FIGS. 4-7). The system 300 may be a computer system, camera system, PDA, cellular telephone, a process control system or any system employing a processor and associated memory. The system 300 includes a central processing unit (CPU) 302, e.g., a microprocessor, that communicates with the flash memory 110 and an I/O device 312 over a bus 310. It must be noted that the bus 310 may be a series of buses and bridges commonly used in a processor system, but for convenience purposes only, the bus 310 has been illustrated as a single bus. A second I/O device 314 is illustrated, but is not necessary to practice the invention. The processor system 300 also includes random access memory (RAM) device 316 and may include a read-only memory (ROM) device (not shown), and peripheral devices such as a floppy disk drive 304 and a compact disk (CD) ROM drive 306 that also communicate with the CPU 302 over the bus 310 as is well known in the art.

While the invention has been described in detail in connection with preferred embodiments known at the time, it should be readily understood that the invention is not limited to the disclosed embodiments. Rather, the invention can be modified to incorporate any number of variations, alterations, substitutions or equivalent arrangements not heretofore described, but which are commensurate with the spirit and scope of the invention. For example, while the invention is described in connection with a CMOS pixel imager, it can be practiced with any other type of pixel imager (e.g., CCD, etc.). In addition, although the invention is described in connection with eight programmable zones in each of the x-direction and the y-direction, the invention can be practiced with any number of programmable zones. Accordingly, the invention is not limited by the foregoing description or drawings, but is only limited by the scope of the appended claims.

What is claimed is:

1. A method of operating a memory device comprising the steps of:
    initiating a sequential outputting of a first data page from an output portion of the memory device; and
    transferring a first portion of a second data page into a first portion of the output portion of the device after a first portion of the first data page has been output and while a second portion of the first data page is being output from a second portion of the output portion,
    wherein the transferring occurs after it is determined that the outputting of the first data page reaches a predetermined transfer point, and
    wherein the transfer point corresponds to a number of bytes in the first portion of the first data page.

2. A method of operating a memory device comprising the steps of:
    initiating a sequential outputting of a first data page from an output portion of the memory device; and
    transferring a first portion of a second data page into a first portion of the output portion of the device after a first portion of the first data page has been output and while a second portion of the first data page is being output from a second portion of the output portion,
    wherein the transferring occurs after it is determined that the outputting of the first data page reaches a predetermined transfer point, and
    wherein the transfer point is selected based on a time required to fetch the second data page from a memory array in the memory device.

3. The method of claim 2, wherein the transfer point is input from a device external to the memory device.

4. A method of operating a memory device comprising the steps of:
    initiating a sequential outputting of a first data page from an output portion of the memory device;
    transferring a first portion of a second data page into a first portion of the output portion of the device after a first portion of the first data page has been output and while a second portion of the first data page is being output from a second portion of the output portion; and
    fetching the second data page from a memory array of the memory device while the first portion of the first data page is being output,
    wherein the transferring occurs after it is determined that the outputting of the first data page reaches a predetermined transfer point, and wherein the transfer point corresponds to one of a number of bytes in the first portion of the first data page or a time required to fetch the second data page from a memory array in the memory device.

5. The method of claim 4 further comprising a step of transferring a second portion of the second data page into the second portion of the output portion of the memory device after all of the first data page has been output.

6. The method of claim 4 further comprising the steps of:
    transferring a second portion of the second data page into the second portion of the output portion of the memory device after all of the first data page has been output; and
    initiating the outputting of the first portion of the second data page from the first portion of the output portion.

7. A method of operating a memory device comprising the steps of:
    initiating a sequential outputting of a first data page from an output portion of the memory device; and
    transferring a first portion of a second data page into a first portion of the output portion of the device after a first portion of the first data page has been output and while a second portion of the first data page is being output from a second portion of the output portion,
    wherein the output portion of the memory device is a cache memory and the second data page is transferred from a sense amplifier into the first portion of the cache memory, and
    wherein the transferring occurs after it is determined that the outputting of the first data page reaches a predetermined transfer point, and wherein the transfer point corresponds to one of a number of bytes in the first portion of the first data page or a time required to fetch the second data page from a memory array in the memory device.

8. A method of operating a flash memory device, comprising the steps of:

initiating a sequential output of a first page from a cache portion of the device;
    initiating a fetch of a second page from a memory array of the device;
    determining that the outputting of the first page has reached a predetermined transfer point;
    initiating a transfer of a first portion of the second page into a first portion of the cache portion once it has been determined that the predetermined transfer point has been reached and while first page is still being output from a second portion of the cache portion; and
    initiating a transfer of a second portion of the second page into the second portion of the cache portion after all of the first page has been output,
    wherein the predetermined transfer point corresponds to one of a number of bytes in the first portion of the first page or a time required to fetch the second page from a memory array in the memory device.

9. The method of claim 8, further comprising the step of initiating an outputting of the first portion of the second page from the first portion of the cache portion after all of the first page has been output.

10. A memory device comprising:
    a memory array comprising multiple pages of data;
    sense amplifiers connected to the array and for fetching data from the multiple pages in the array;
    a cache portion for outputting data transferred from the sense amplifiers; and
    a controller for initiating a sequential output of a first data page from the cache portion and initiating transfer of a first portion of a second data page into a first portion of the cache portion after a first portion of the first data page has been output and while a second portion of the first data page is being output from a second portion of the cache portion,
    wherein the controller initiates transfer of the first portion of the second data page after it determines that the outputting of the first data page has reached a predetermined transfer point, and
    wherein the transfer point corresponds to a number of bytes in the first portion of the first data page.

11. The memory device of claim 10, wherein the controller inputs the transfer point from a device external to the memory device.

12. The memory device of claim 10, wherein the controller further initiates a transfer of a second portion of the second data page into the second portion of the cache portion after it determines that all of the first data page has been output.

13. A memory device comprising:
    a memory array comprising multiple pages of data;
    sense amplifiers connected to the array and for fetching data from the multiple pages in the array;
    a cache portion for outputting data transferred from the sense amplifiers; and
    a controller for initiating a sequential output of a first data page from the cache portion and initiating transfer of a first portion of a second data page into a first portion of the cache portion after a first portion of the first data page has been output and while a second portion of the first data page is being output from a second portion of the cache portion,
    wherein the controller initiates transfer of the first portion of the second data page after it determines that the outputting of the first data page has reached a predetermined transfer point, and
    wherein the transfer point is selected based on a time required to fetch the second data page from the memory array.

14. The memory device of claim 13, wherein the controller initiates a transfer of a second portion of the second data page into the second portion of the cache portion after all of the first data page has been output and initiates the outputting of the first portion of the second data page from the first portion of the cache portion.

15. A memory device comprising:
    a memory array comprising multiple pages of data;
    sense amplifiers connected to the array and for fetching data from the multiple pages in the array;
    a cache portion for outputting data transferred from the sense amplifiers; and
    a controller for initiating a sequential output of a first data page from the cache portion and initiating transfer of a first portion of a second data page into a first portion of the cache portion after a first portion of the first data page has been output and while a second portion of the first data page is being output from a second portion of the cache portion,
    wherein the controller initiates the fetching of the second data page from the memory array while the first portion of the first data page is being output, and
    wherein the controller initiates transfer of the first portion of the second data page after it determines that the outputting of the first data page has reached a predetermined transfer point, and wherein the transfer point corresponds to one of a number of bytes in the first portion of the first data page or a time required to fetch the second data page from the memory array.

16. A flash memory device comprising:
    a memory array comprising multiple pages of data;
    sense amplifiers connected to the array and controllable to fetch data from the array;
    a cache portion for outputting data transferred from the sense amplifiers; and
    a controller, said controller initiates a sequential output of a first data page from the cache portion, initiates a fetch of a second data page from the array to the sense amplifiers, determines that the outputting of the first data page has reached a predetermined transfer point, initiates a transfer of a first portion of the second data page into a first portion of the cache portion once the transfer point has been reached and while first data page is still being output from a second portion of the cache portion, and initiates a transfer of a second portion of the second data page into the second portion of the cache portion after all of the first data page has been output,
    wherein the transfer point corresponds to one of a number of bytes in the first portion of the first data page or a time required to fetch the second data page from the memory array.

17. The memory device of claim 16, wherein the controller monitors an address pointer to determine when the transfer point has been reached.

18. The memory device of claim 16, wherein the controller initiates the outputting of the first portion of the second data page from the first portion of the cache portion after all of the first data page has been output.

19. A flash memory device comprising:
    an output data cache for storing a page of data;
    an address pointer for identifying byte locations within the cache;
    a sense amplifier circuit;
    a memory array comprising a plurality of pages of data; and a controller, said controller monitoring the address pointer, said controller initiates a sequential output of a first data page from the cache, initiates a fetch of a second data page from the array to the sense amplifiers, determines that the address pointer indicates that the outputting of the first data page has reached a predetermined point, initiates a transfer of a first portion of the second data page into a first portion of the cache once the predetermined point has been reached and while first data page is still being output from a second portion of the cache, initiates a transfer of a second portion of the second data page into the second portion of the cache when the address pointer has reached an ending location of the cache; and initiates the outputting of the first portion of the second data page from the first portion of the cache after the address pointer has wrapped around to point to a starting location within the cache.

20. A processor system, comprising:

a processor; and a memory device connected to the processor, said memory device comprising:

a memory array comprising multiple pages of data, sense amplifiers connected to the array and for fetching data from the array, a cache portion for outputting data transferred from the sense amplifiers, and a controller for initiating output of a first page from the cache portion and initiating transfer of a first portion of a second page into a first portion of the cache portion after a first portion of the first page has been output and while a second portion of the first page is being output from a second portion of the cache portion, wherein the controller initiates the fetching of the second page from the memory array while the first portion of the first page is being output, and wherein the controller initiates transfer of the first portion of the second page after it determines that the outputting of the first data page has reached a predetermined transfer point, and wherein the transfer point corresponds to one of a number of bytes in the first portion of the first page or a time required to fetch the second page from the memory array.

21. The system of claim 20, wherein the controller further initiates a transfer of a second portion of the second page into the second portion of the cache portion after it determines that all of the first page has been output.

22. The system of claim 20, wherein the controller initiates a transfer of a second portion of the second page into the second portion of the cache portion after all of the first page has been output and initiates the outputting of the first portion of the second page from the first portion of the cache portion.

* * * * *

UNITED STATES PATENT AND TRADEMARK OFFICE
CERTIFICATE OF CORRECTION

PATENT NO. : 7,546,416 B2
APPLICATION NO. : 11/474436
DATED : June 9, 2009
INVENTOR(S) : Aaron Yip Page 1 of 1

It is certified that error appears in the above-identified patent and that said Letters Patent is hereby corrected as shown below:

In the Specification:

Column 5, lines 42 to lines 48, please delete the text that reads:

"For example, while the invention is described in connection with a CMOS pixel imager, it can be practiced with any other type of pixel imager (e.g., CCD, etc.) In addition, although the invention is described in connection with eight programmable zones in each of the x-direction and the y-direction, the invention can be practiced with any number of programmable zones."

Signed and Sealed this

Thirteenth Day of October, 2009

David J. Kappos
*Director of the United States Patent and Trademark Office*